Patented Dec. 8, 1925.

1,564,433

UNITED STATES PATENT OFFICE.

ROSCOE P. MASE, OF WILKINSBURG, PENNSYLVANIA, ASSIGNOR TO MINE SAFETY APPLIANCES COMPANY, OF PITTSBURGH, PENNSYLVANIA, A CORPORATION OF PENNSYLVANIA.

GAS-PURIFYING COMPOSITION.

No Drawing. Application filed June 2, 1922. Serial No. 565,429.

*To all whom it may concern:*

Be it known that I, ROSCOE P. MASE, a citizen of the United States, and a resident of Wilkinsburg, in the county of Allegheny and State of Pennsylvania, have invented a new and useful Improvement in Gas-Purifying Compositions, of which the following is a specification.

The object of this invention is to provide a gas purifying composition, which, although capable of removing various impurities from gases, is particularly effective for use in gas masks and like devices, to remove ammonia from air to be breathed.

A further object it to provide an ammonia-removing composition which is dry, and which because of its dryness may be used in gas mask apparatus and the like without corroding the canister containing it, and without clouding the eye-pieces of the mask when they are in use.

A still further object is to provide a composition for the purpose explained which may be used in the same canister with other absorbents which absorbents must be kept free of moisture in order to preserve their absorption efficiency.

The improved composition comprises activated vegetable charcoal, formed for example from cocoanut shells, impregnated with an anhydrous copper salt, preferably copper sulphate. It is well known that crystalline copper salts, and particularly crystalline copper sulphate, readily remove ammonia from a gas containing it, and that this is effected by liberation of water. It is also known that activated charcoal is capable of removing ammonia from a gas with which it is mixed. However, I have discovered, and it is this discovery upon which my invention is predicated, that a composition comprising activated charcoal impregnated with an anhydrous copper salt is much more effective for removing ammonia from gases than are equal amounts of the two components when used separately, or in other words when uncombined to form a composition.

The standard test for determining the efficiency of a material or composition for removing ammonia from a gas consists in passing a 2% ammonia—98% air mixture through a ten centimeter layer of the material, the rate of flow of the gas being 500 cubic centimeters per square centimeter across section per minute, and in observing the length of time that the material removes all of the ammonia. The above explained discovery may be fully understood from an explanation of a series of such tests which I have made to determine the individual absorption efficiency of each component of the composition, and to determine the absorption efficiency of the composition itself.

Two samples of activated charcoal, which for convenience may be designated as No. 1 and No. 2, when subjected to the above test functioned at 100% efficiency for two-and-a-quarter and four minutes, respectively. In other words at the ends of the times stated ammonia first began to pass through the charcoal. In testing the absorption efficiency of anhydrous copper sulphate alone, it was necessary to impregnate it in an inert substance because anhydrous copper sulphate is too soft to permit the free passage of the air and ammonia mixture through it. For this purpose pumice was used. It was determined first that the pumice alone would not function for any period of time at 100% efficiency, and that at the end of three minutes substantially all the ammonia passed through it unabsorbed. The pumice impregnated with anhydrous copper sulphate functioned at 100% efficiency for five and one-half minutes.

The two samples of activated charcoal No. 1 and No. 2, when impregnated with anhydrous copper sulphate functioned at 100% efficiency for eighteen and twenty-three minutes, respectively, showing that the action of the two substances when combined was from about four to five times as efficient as when the two acted separately.

Tests were also made to determine whether a composition consisting of wood charcoal impregnated with an anhydrous copper salt would function in any way similar to the composition consisting of activated charcoal and anhydrous copper sulphate. It was found that ordinary wood charcoal impregnated with anhydrous copper sulphate functioned for six minutes at 100% efficiency, which is only a half minute longer than the functioning of pumice impregnated with anhydrous copper sulphate.

As to the explanation of this result, it may be that activated charcoal acts as a catalyst upon the anhydrous copper sulphate to accentuate the reaction between it and the ammonia, or it may be that the activated charcoal arrests the ammonia gas temporarily in its progress through the composition and thereby brings it into such intimate contact with the anhydrous copper sulphate that reaction takes place. Whatever the explanation of the phenomena may be, the fact remains that activated charcoal impregnated with an anhydrous copper salt removes ammonia far more efficiently than does either of the two substances taken separately, and than does ordinary wood charcoal impregnated with an anhydrous copper salt.

In manufacturing the composition, crystalline copper sulphate may be impregnated into the activated charcoal, and the composition subsequently dried to remove the water content of the copper sulphate and reduce it to an anhydrous state. By way of example, and not of limitation, a crystalline copper sulphate solution may be formed having about 750 gr. of crystalline copper sulphate per liter of water. When this solution is at its boiling point, activated charcoal placed in a suitable perforated container may be immersed in the solution and stirred so that it may become adequately impregnated with the solution. The container is then removed, the excess solution drained back into the vat containing it, and the impregnated charcoal washed to remove the impregnated solution from the outer surface of the granules so as to prevent their pores from being plugged up. The composition is then dried to dehydrate the copper sulphate, the drying temperature being as high as possible without burning the charcoal. When thus dehydrated, the composition consists of activated charcoal impregnated with anhydrous copper sulphate.

This way of manufacturing the composition was followed in making all the samples, the tests of which for ammonia absorption efficiency are described above.

When the composition is used to remove ammonia from air to be breathed, it may be placed in canisters without specifically treating them to prevent corrosion, because anhydrous copper salts will not react with the sheet iron body of the canister. Furthermore, because no moisture is liberated in the removal of ammonia, the eye-pieces of gas masks do not become clouded, as they do when water is liberated from an ammonia-removing composition, and the composition may be used in a canister with absorbents which may be kept free of moisture in order to preserve their absorption efficiency, as for example hopcalite. While these are substantial advantages incident to the use of the improved composition in gas masks, it is to be understood that the composition is not limited to any particular use. Also, while the composition is especially effective for removing ammonia from gases with which it may be mixed, the activated charcoal retains its capabilities of removing from gaseous mixtures any gases which it is capable of removing when unimpregnated.

I claim:

1. A composition for removing ammonia from gases, comprising activated charcoal impregnated with an anhydrous copper salt.

2. A composition for removing ammonia from gases, comprising activated charcoal impregnated with anhydrous copper sulphate.

In testimony whereof, I sign my name.

ROSCOE P. MASE.